United States Patent [19]

Cather, Jr. et al.

[11] 4,335,889
[45] Jun. 22, 1982

[54] SHAFT SEAL WITH LINER FLANGE

[75] Inventors: Douglas A. Cather, Jr., Gastonia, N.C.; Martin E. Benjamin, Danielson, Conn.

[73] Assignee: Garlock Inc., Longview, Tex.

[21] Appl. No.: 163,564

[22] Filed: Jun. 27, 1980

[51] Int. Cl.³ ............................................. F16J 15/32
[52] U.S. Cl. ...................................... 277/152; 277/1; 277/165; 277/178; 277/183
[58] Field of Search ................. 277/152, 153, 1, 9, 277/165, 166, 178, 183

[56] References Cited

U.S. PATENT DOCUMENTS

| | | | |
|---|---|---|---|
| 1,430,699 | 10/1922 | Stratford | |
| 2,476,324 | 7/1949 | Reich | 277/152 |
| 2,600,293 | 6/1952 | Heldal | 277/152 X |
| 2,690,470 | 9/1954 | Moorhead | 277/178 X |
| 2,804,324 | 8/1957 | Stallings | 277/153 |
| 2,873,153 | 2/1959 | Haynie | 308/187.2 |
| 3,011,814 | 12/1961 | Rhoads et al. | |
| 3,306,683 | 2/1967 | Deuring | 308/187.2 |
| 3,493,645 | 2/1970 | Sanderson et al. | 264/161 |
| 3,801,111 | 4/1974 | Messenger | 277/58 |
| 3,829,105 | 8/1974 | Kammeraod | 277/183 |
| 4,038,359 | 7/1977 | Pendleton | 264/263 |
| 4,155,153 | 5/1979 | Bainard et al. | 29/469.5 |
| 4,159,298 | 6/1979 | Bainard | 277/1 X |
| 4,166,627 | 9/1979 | Bainard et al. | 277/95 |
| 4,168,837 | 9/1979 | Benjamin et al. | 277/24 |
| 4,239,243 | 12/1980 | Bainard et al. | 277/153 |

FOREIGN PATENT DOCUMENTS

| | | | |
|---|---|---|---|
| 2801711 | 9/1978 | Fed. Rep. of Germany | 277/153 |
| 1258972 | 3/1961 | France | 277/152 |
| 1360293 | 3/1964 | France | 277/153 |

*Primary Examiner*—Robert S. Ward, Jr.
*Attorney, Agent, or Firm*—Schovee & Boston

[57] ABSTRACT

An annular trimmed lip shaft seal of the type not having a metal shell but consisting solely of an elastomeric body and a liner of low friction material bonded thereto, which liner includes a radial flange extending radially out beyond the outside diameter of the elastomeric body for abutting the housing for locating the seal, and for strengthening the seal to provide seal retention and alignment. A method for making the seal and a method for locating, retaining and aligning a seal are also disclosed.

11 Claims, 4 Drawing Figures

SHAFT SEAL WITH LINER FLANGE

TECHNICAL FIELD

This invention relates to annular shaft seals and in one embodiment to narrow cross-section seals, a method for their manufacture and a method for locating, retaining and aligning such seals in a housing bore.

BACKGROUND

It is known to line the lip of a shaft seal with a liner of material having a low coefficient of friction (hereinafter referred to as a low friction material). However, problems are encountered when the diameter of the sealing lip is less than about 0.5". This situtation usually requires pre-forming the polytetrafluoroethylene (or other low-friction material) disc prior to molding, thus increasing the costs involved. Problems are also involved when the seal cross-section (the radial dimension between the seal inside and outside radius, i.e. dimension "A" in FIG. 1) is narrow (hereby defined as being less than approximately 0.125"). In this case, there is not sufficient room available to use the normal metal shell and polytetrafluoroethylene liner in the seal without minimizing the rubber bonding area with respect to the shell and the liner to such a small amount that it could cause seal failure. Therefore, the shell must be omitted, causing a problem with seal retention in the bore and proper square seal alignment (especially on through bores i.e., bores such as bore 12 in FIG. 2 without a shoulder abutting the seal).

It is an object of the present invention to provide a seal, a method for making a seal, and a method for maintaining seal alignment that overcome the above-mentioned problems in the prior art.

It is another object of this invention to provide a seal consisting solely of an elastomeric body and a low friction liner (i.e. a seal with no metal shell), wherein the liner has a radial flange extending radially out beyond the outside diameter of the elastomeric body for locating, retaining, and aligning the seal in a housing bore.

It is another object of this invention to provide a method for making a seal using a single sheet of low friction material in a multi-cavity mold to reduce expensive manufacturing operations and to improve material handling.

BRIEF SUMMARY OF THE INVENTION

This invention relates to a seal, a method for making the seal, and a method for locating, retaining and aligning a seal in a bore, wherein the seal consists solely of an annular, molded elastomeric body and a liner of low friction material (such as polytetrafluoroethylene) bonded thereto. The liner includes an annular flange that extends outwardly beyond the outside diameter of the elastomeric body. This flange aids in seal retention in the housing, locates the seal and maintains seal alignment (prevents cocking of the seal). This flange thus performs many of the functions usually provided by a metal shell.

The seal can be a narrow cross-section seal that can not have a metal shell, or it can be a seal in which the metal shell is omitted to reduce costs.

The method for making this seal with the liner flange includes using a single sheet of low friction material in a multi-cavity mold, instead of using individual pre-formed discs of liner material. This single sheet can be flat (FIG. 3) or it can be preformed (FIG. 4). This method thus eliminates several expensive manufacturing operations on the liner and improves material handling during loading of the mold, thus saving time. The elastomer can also be a single sheet placed over the single sheet of liner material, or it can be one or more preforms arranged so that the elastomeric material flows to all of the cavities. When the single sheet of liner material is pre-formed, a separate pre-form of elastomer can be used for each mold cavity because their locations can be determined by the operator, in contrast to the embodiment wherein the liner sheet is flat (not pre-formed).

The method of locating, retaining and aligning a seal comprises the steps of inserting the seal of the present invention in a housing bore with the liner flange abutting the housing surrounding the bore.

BRIEF DESCRIPTION OF THE DRAWINGS

The present invention will be more fully understood by reference to the following detailed description thereof, when read in conjunction with the attached drawings, wherein like reference numerals refer to like elements and wherein.

DETAILED DESCRIPTION OF THE INVENTION

Figure 1:
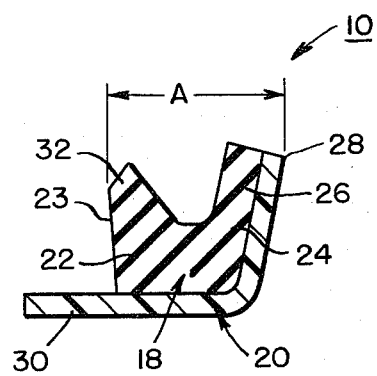
FIG. 1 is a cross-sectional view through one half of the seal of the present invention.
Figure 2:
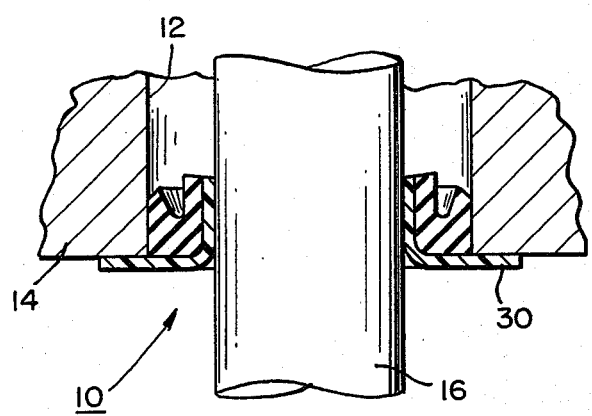
FIG. 2 is a partly cross-sectional view showing the seal of FIG. 1 as installed in a housing bore and in sealing contact with a shaft extending through the bore.

With reference now to the drawings, FIGS. 1 and 2 show an annular shaft seal 10 according to the present invention. FIG. 2 shows the seal 10 installed in a bore 12 of a housing 14, and sealing the annular space between the bore 12 and a shaft 16 extending through the bore. In one application, the housing 14 is a housing for a small motor and the shaft 16 drives a cooling fan; such motors and fans find use on computers and on hair dryers, for example, where the motors are of very low horsepower and where the seal must produce a very small amount of friction.

The seal 10 does not have a metal shell but consists solely of an annular molded elastomeric body 18 and a liner 20 of low friction material, preferably sintered polytetrafluoroethylene. The seal 10 includes a heel section 22 having an outside diameter press-fit surface 23, a flex section 24 and a flexible sealing element 26. The liner 20 covers the entire radially inner surface (from a trimmed lip 28 axially outwardly) and the entire axially outer radial surface of the elastomeric body 18. The liner 20 also includes an annular radial flange 30 extending radially outwardly beyond the outside diameter of the elastomeric body a sufficient distance to form a suitable flange for location, retention, and alignment of the seal in the housing bore. In one embodiment, this distance is about 0.030". In such embodiment, the housing bore diameter is 0.350", the O.D. of the flange 30 is 0.410", the shaft diameter is 0.156" and the axial height or length of the seal I.D. is about 0.105". The liner 20 preferably has a thickness of about 0.015". The outside surface 23 of the heel section of the elastomeric body 18 preferably is not cylindrical but tapers slightly radially outwardly in the axially inner direction, to provide a press-fit surface (however, it is not essential that the seal be a press-fit in the bore 12 as long as there is a bore seal of some type In FIG. 2, for example, the axially inner direction is in the upper direction.

The elastomeric body 18 includes a toe section 32 having a chamfered lead-in surface to aid in installation of the seal 10 in the bore 12.

As shown in FIG. 2, the flange 30 abuts the housing 14 and thus locates the seal 10 in the bore 12, which is especially useful in through-bores not having an interior shoulder to abut against and locate the seal. The flange 30 also helps to provide a stiffening function for the seal which aids seal retention and alignment and prevents, for example, cocking of the seal which could cause loss of the sealing function and loss of seal retention.

Figure 3:
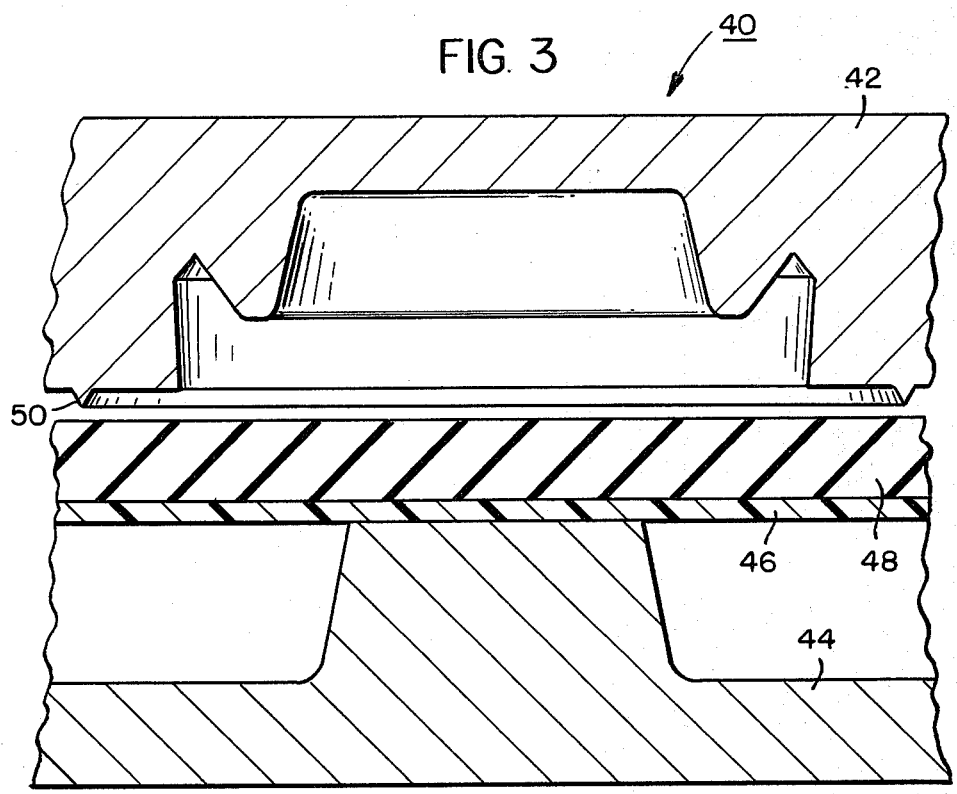
FIG. 3 is a partial cross-sectional view through an open mold cavity showing one embodiment of the method of the present invention.

FIG. 3 illustrates one embodiment of the method of the present invention for making the seal 10 using a multi-cavity compression mold 40 (only one cavity of which is shown) including upper and lower mold parts 42 and 44, respectively. According to this embodiment of the present invention, a single flat sheet 46 of low friction liner material is placed on the lower mold part 44. Then a single sheet 48 of elastomeric material is placed over the liner sheet 46 and the mold is closed causing the elastomer to flow into the mold cavities, forming the liner material to the desired shape as shown in FIGS. 1 and 2, bonding the liner to the molded elastomeric material, and cutting the liner with a circular coining ring 50. The liner is cut sufficiently through such that, when the mold is opened, the individual seals can be easily separated. Preferably the coining ring pierces the liner in a circular shape, however, other shapes can be used, including an irregular shape with tabs. In addition, screw holes in the flange 30 can be provided, if desired.

Figure 4:
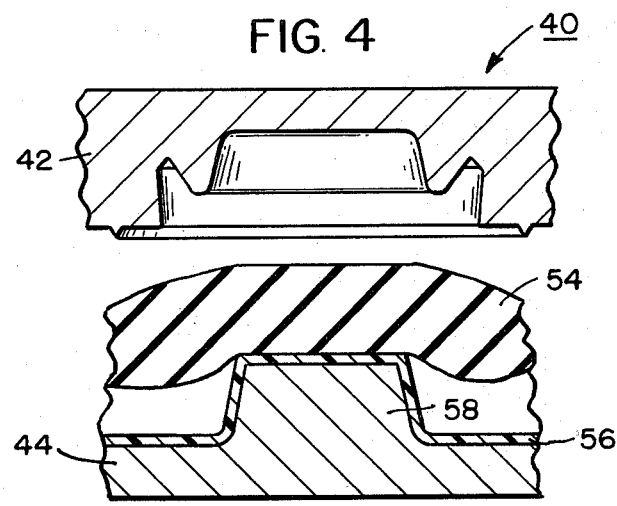
FIG. 4 is a partial cross-sectional view through an open mold cavity showing another embodiment of the method of the present invention.

The liner sheet 46 can be flat as shown in FIG. 3 or it can be pre-formed as shown in FIG. 4.

FIG. 4 shows another embodiment of the method of the present invention similar to that shown in FIG. 3 except that in FIG. 4 a sheet 56 of liner material is used that is not flat but that has been pre-formed to provide a cup-shaped portion corresponding to and mating with each pin 58 on the lower mold part 44. In addition, FIG. 4 differs from FIG. 3 in that instead of using a single flat sheet of elastomer, a smaller, thicker preform of elastomer is used. Alternatively, several separate preforms of elastomer can be used, including one for each cavity, if desired.

Either of the methods of FIGS. 3 or 4 can use either of the liner sheets and any one of the possible elastomer shapes.

When the mold 40 is closed, the rubber flows into the mold cavities and in FIG. 3 forces the liner sheet to conform to the shape of the lower mold part 44. The mold 40 is then opened and each seal is punched out of the sheet and knife-trimmed to form the sealing lip 28.

The coining ring 50 preferably extends only about two-thirds of the way through the sheet 46 of liner material when the mold is closed, to avoid damage thereto. A ring (not shown) around the periphery of the mold 40 stops the closing of the mold.

While the present invention has been described with reference to the preferred embodiment of a narrow cross-section seal, the flange 30 can also be used on other seals, such as on seals where it is desired to eliminate the metal shell to reduce costs and to substitute therefor the flange of the present invention to more economically provide strength for the seal.

The invention has been described in detail with particular reference to the preferred embodiments thereof, but it will be understood that variations and modifications can be affected within the spirit and scope of the invention as described hereinabove and as defined in the appended claims. For example, the width, thickness, and shape of the flange 30 can be varied to provide the desired strength for a particular seal and seal application. Other shapes and types of seals can be used. The term "consisting solely of an elastomeric body and a liner bonded thereto" is meant to exclude a metal shell. It is not intended as excluding other features, for example, the seal could have additional lips, garter or other springs, etc. The liner does not have to be continuous, as long as it is on the sealing lip and forms the annular flange 30. The flange 30 extends radially out beyond the press-fit surface 23 or other bore-contacting surface of the elastomeric body. Some of the elastomeric body 18 may exist on one or both of the radial sides of the flange 30. Further, the mold parts can obviously be reversed with the upper mold part 42 positioned below the lower mold part 44 and with the elastomer positioned below the liner sheet.

We claim:

1. An article comprising:
   (a) a shaft seal having an annular sealing lip and consisting solely of a molded elastomeric body having a bore contacting surface and a liner of low friction material bonded to said body at least at said sealing lip; and
   (b) said liner including a radial flange extending radially outwardly beyond said bore-contacting surface of said elastomeric body.

2. The article as recited in claim 1 wherein said seal is an annular, trimmed lip, narrow cross-section seal.

3. The article as recited in claim 2 wherein said liner extends continuously from said sealing lip to said flange.

4. The article as recited in claim 3 wherein said flange extends about 0.030" beyond said bore-contacting surface.

5. The article as recited in claim 4 wherein said flange is circular.

6. An article comprising:
   (a) an annular, trimmed lip shaft seal consisting solely of an annular molded elastomeric body and a liner of low friction material bonded to said body;
   (b) said body having an outside diameter press-fit surface and including a heel section, a flex section, and a flexible sealing element having a trimmed lip; and
   (c) said liner covering the entire radially inner surface of said elastomeric body from said lip axially outwardly and also covering the entire axially outer radial surface of the elastomeric body, and said liner including an annular radial flange extending radially outwardly beyond said press-fit surface of said elastomeric body.

7. The article as recited in claim 6 wherein said seal has a narrow cross-section of less than approximately 0.125".

8. The article as recited in claim 6 wherein said press-fit surface in its asmolded condition tapers radially outwardly in the axially inner direction.

9. The article as recited in claim 6 wherein said flange has a thickness of about 0.015".

10. The article as recited in claim 6 wherein said flange extends approximately 0.030" beyond said outside diameter press-fit surface.

11. The article as recited in claim 6 wherein said flange is circular.

* * * * *